Dec. 17, 1929.    D. C. BEMONT    1,739,628
BICYCLE, VELOCIPEDE, OR THE LIKE
Filed March 25, 1927
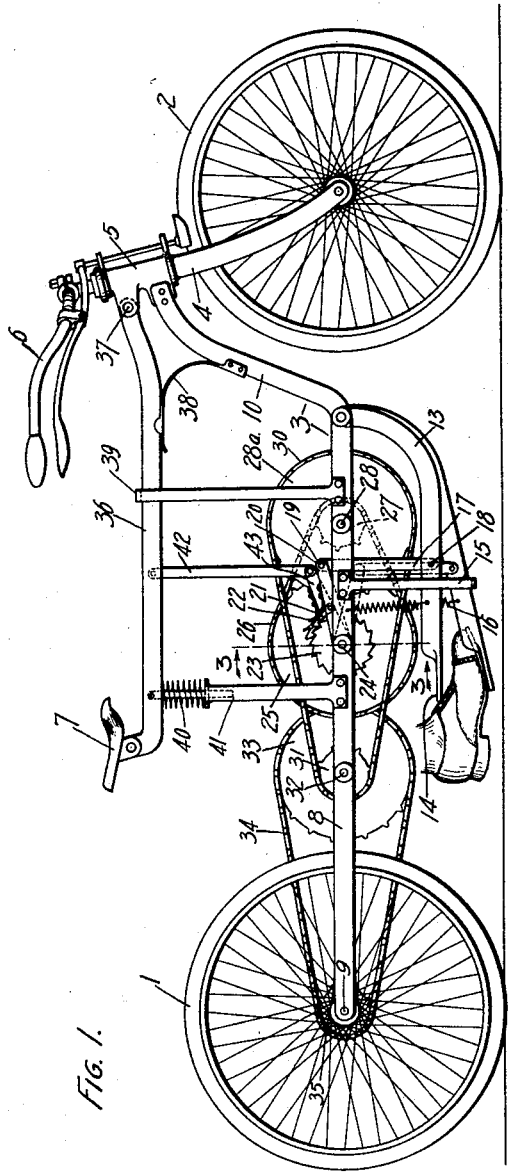
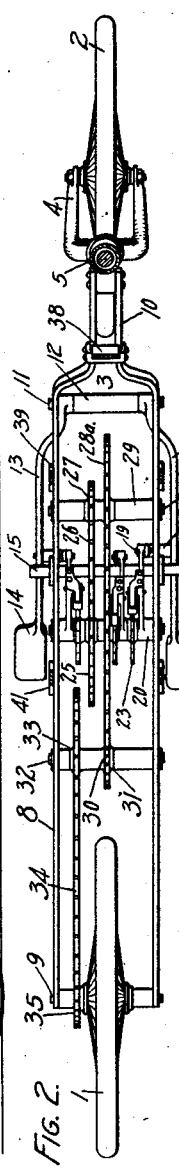
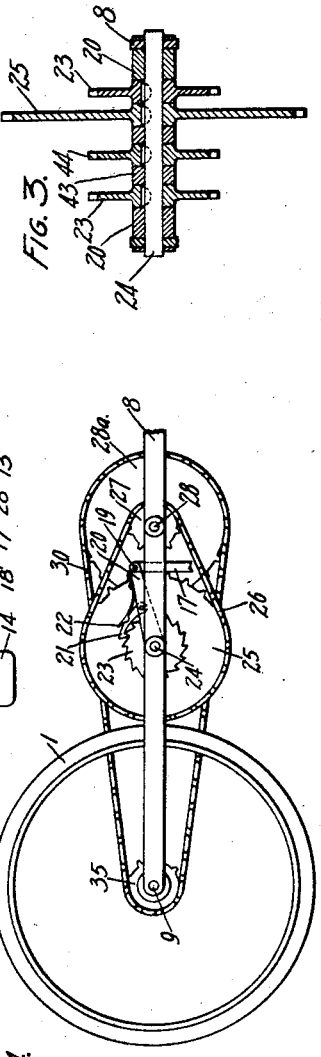
INVENTOR
ATTORNEY Patented Dec. 17, 1929

1,739,628

UNITED STATES PATENT OFFICE

DELOSS C. BEMONT, OF MERIDEN, CONNECTICUT, ASSIGNOR OF ONE-THIRD TO EDWARD BEMONT, OF MERIDEN, CONNECTICUT

BICYCLE, VELOCIPEDE, OR THE LIKE

Application filed March 25, 1927. Serial No. 178,410.

My invention relates to bicycles, velocipedes, or the like.

It has for its object to provide an improved device of the character set forth, and more particularly an improved construction whereby the weight of the operator may be utilized in an improved manner to propel the same. A further object of my invention is to provide an improved propulsion mechanism whereby by simply shifting his weight from one foot to the other at relatively widely spaced intervals and with the use of a minimum of energy on the part of the operator, he may cause the device to be propelled along the highway. A still further object of my invention is to provide an improved mechanism, and more especially a mechanism adapted to cooperate with the mechanism above mentioned, which is operated by bringing the weight of the operator to bear upon the seat of the device in such manner as also to propel the device along the highway, this device being particularly adapted to supplement the foot-propelled means, as when ascending a grade or the like. These and other objects and advantages of my improved construction will, however, hereinafter more fully appear.

In the accompanying drawings, I have shown for purposes of illustration two embodiments which my invention may assume in practice, the same being illustrated in connection with a bicycle of usual type, although it will be understood that the invention is not limited to embodiment in such a bicycle, but may, on the contrary, be embodied in velocipedes or tricycles, or even in devices of four wheel form, without departing from the spirit of my invention.

In these drawings,—

Figure 1 is a side elevation of one illustrative form of my invention;

Fig. 2 is a plan view of the mechanism thereof, certain of the seat parts being broken away to facilitate illustration;

Fig. 3 is a detail sectional view on line 3—3 of Fig. 1, and

Fig. 4 is a side elevation of a modified form of drive, the wheel spokes being omitted to facilitate illustration.

In this illustrative construction I have shown a bicycle comprising the usual rear and front wheels 1 and 2 and provided with a suitable frame, generally indicated at 3, supported at its rear end on the wheel 1 and carrying at its front end the usual forks 4, front head 5, and handlebars 6, while a seat 7 and improved foot operated connections beneath the same are located between the wheels and operatively connected to the rear wheel in an improved manner, these improved driving connections being hereinafter more fully described.

Referring more particularly to the construction shown in Figs. 1 to 3, it will be noted that the frame 3 is provided with horizontal, laterally spaced bottom sections or members 8, in the rear ends of which the rear wheel 1 is journaled at 9. These members 8 are herein also bent together and upward at their front ends, as shown at 10, and connected to the lower end of the head 5. Herein, the two members 8 are also connected at their front end by a transverse member 11. To the opposite ends of this member 11 are pivoted, at points just inside the members 8 and between these members and a central spacing member 12, depending downwardly and preferably outwardly disposed foot levers 13 which extend rearwardly under the members 8. As shown, each lever 13 is herein provided with a foot-rest 14 at its rearward end and is so constructed and disposed that when this end of the lever is depressed to its bottommost position it will still clear the highway. As shown, a suitable support, herein in the form of a transverse stop or support 15 of U shape, is extended from one member 8 down under the levers 13 and up to the other member 8 in such manner as to form a stop and support therefor when the same are in their bottommost position. These members 13 are also preferably provided with suitable means, herein in the form of coiled springs 16 extending between the rear ends thereof and the members 8, acting in such manner as normally to hold them in elevated position and return them to that position when the operator's weight is removed from the foot-rest 14.

Operatively connected to these levers 13 is an improved driving mechanism disposed between the front and rear wheels 1, 2 and adapted to be operated to transmit power to the rear wheel 1 as the members 13 are moved downward. Herein, each of the levers 13 is provided with an inwardly bent and then upwardly extending link 17 pivoted to the lever at 18 at a point in front of its foot-rest 14 and substantially in rear of its pivot 11. Each of these links 17 in turn is pivoted at its upper end at 19 to the front end of an elongated pawl carrying arm 20 carrying a pawl 21 and a spring 22 cooperating with the pawl to force the same into engagement with a ratchet wheel 23 connected to the rear wheel as hereinafter described. As shown in Fig. 3, each pawl carrying arm 20 is journaled on a suitable cross shaft 24 suitably journaled in the frame members 8, and each ratchet wheel 23 is fixed to that shaft, as by a key or the like, the journals for the members 20 herein being disposed outside the ratchet wheels 23 and between the latter and the frame members 8. Further, it will be noted that each of the ratchet wheels 23 rotates with a large power or driving member, herein in the form of a sprocket 25, likewise coaxial with the shaft 24 and fixed thereto, the ratchet wheels in turn being on opposite sides of the member 25. Thus it will be evident that whenever desired either lever 13 may be depressed by the weight of the operator to pull down its connected pawl carrying arm 20 in such manner as to cause its pawl 21 to engage and rotate its ratchet wheel 23 and the connected sprocket 25, and thereby impart an impulse to that member, which is the driving member of the device. It will also be noted that the member 25 is rotated in the same direction as the ground wheels 1 and 2 and that between downward actuations of the arms 20 and while the latter are held up by the springs 16 in position to be again depressed, the member 25 is free to continue to rotate in that direction, the ratchet wheels then rotating freely under the pawls 21.

Associated with this sprocket 25 are driving connections between the same and the rear wheel 1. If desired, the sprocket may be connected directly to the rear wheel 1 by a suitable chain and sprocket connection. Preferably, however, in order to give a higher gear, improved gearing up connections are also provided. Herein, these include a chain 26 extending from the sprocket 25 to a smaller sprocket 27 carried on a transverse member 28 extending between the frame members 8 at a point in front of the shaft 24. Further, this sprocket 27 is rotatable with a larger coaxial sprocket 28ª, herein integral therewith, and these sprockets are spaced from the frame members 8 by suitable spacing members 29. In the form shown in Figs. 1 to 3, this sprocket 28ª is also connected through a suitable chain 30 with a smaller sprocket 31 carried on a shaft 32 in rear of the shaft 24 in a manner generally similar to the sprocket 27 and herein also formed integral with a larger sprocket 33, which is in turn connected through a chain 34 with the rear sprocket 35 coaxial with the rear wheel 1. Thus, it will be evident that for each impulse imparted to the ratchet wheels 23 by either of the foot levers 13, the rear wheel 1 will be caused to revolve a substantial number of times in such manner as to propel the bicycle for a substantial distance.

Associated with the mechanism described, is also improved supplemental driving mechanism adapted to be operated by the weight of the operator when on the seat 7. Herein, this seat is carried on the rear end of a longitudinally extending upper frame member 36 pivoted at its front end at 37 to the head 5 and extending rearwardly over the mechanism just described. It will also be noted that this member 36 is normally held in elevated position by elevating means of any suitable form. Herein, a flat or leaf spring 38 is carried on the frame portion 10 and acts to support the member 36 and normally hold it in raised position, and to return it to raised position whenever the operator raises his weight off of the seat 7. Suitable stop mechanism, herein in the form of an upstanding U-shaped stop 39, is also provided to limit the upward movement of the same. The member 36 is herein also connected through a reciprocable pin and spring connection 40 to an upstanding U-shaped support 41 provided on the members 8 in rear of the shaft 24, this support having an aperture therein through which the pin of the connection 40 is movable vertically and also serves to limit the possible downward movement of the member 36 while the spring in the connection 40 serves as a further cushioning means for the rider. This seat member 36 is herein also provided at a point between its ends and substantially in rear of its pivot 37, with a depending pivoted member 42, generally similar to the members 17, and a connected pawl carrying arm 43, generally similar to the members 20 and having a pawl and spring thereon similar to the pawls and springs 21 and 22, this arm 43 functioning with another ratchet wheel 44, generally similar to the ratchet wheels 23, and similarly connected to the sprocket wheel 25. Thus it will be evident that when an operator places his weight upon the seat 7, the latter will be depressed to actuate the pawl arm 43 in such a manner as to rotate the sprocket 25. Further, if the operator supported by the rests 14 raises his weight off the seat 7, the latter will be pressed upward in such manner as to bring the pawl of the pawl arm 43 up again into operative position relative to the ratchet wheel 44, ready to be depressed whenever the operator again places his weight upon the seat 7.

In the operation of my improved device, the operator in mounting the bicycle depresses the foot-rest or rests 14 and seat 7 as necessary to get the device in motion, and thereafter simply shifts his weight from one foot to the other to give the desired additional impulses to maintain that speed, the depression of one of the foot-rests 14 being sufficient to propel the wheel by reason of the connected sprockets and chains, for a substatial distance. Should a marked grade be encountered, the operator may also give additional impulses by simply standing on the rests 14 and thereby raising his weight from the seat 7 and then dropping back on the seat in such manner as to utilize his whole weight, an operator usually also pulling up on the handlebars in the customary way when going up a hill.

In Fig. 4 I have illustrated a modified construction of chain and sprocket connection, which is similar to that above described with the exception that the sprockets 31 and 33 have been omitted and the chain 30 has been extended directly back to the sprocket 35 on the rear wheel 1, with a corresponding shortening of the driving mechanism of the bicycle.

It will be obvious that changes in gear may be effected as desired, and that the invention may be utilized with either one or as many intermediate sprockets as the circumstances require, depending, for example, upon whether the same is built in sizes for adults or for children, or for use in level or hilly country. It will also be evident that if desired the device may be rendered even more compact by arranging for a further overlap of the elements and that the location of the pivots and length of the pawl arms may also be varied as desired in adapting the device to such different requirements. Any suitable type of brake may also be employed, the arrangement of the shafting and sprockets, for example, being adapted to permit a coaster brake if desired. If desired, the device may also be put out without the seat propulsion device thereon, although this is ordinarily preferable on account of the additional power derived from the use of the operator's weight in the manner set forth. It will also be understood that the mechanism in any of its forms may, if desired, be applied to a shaft of a three-wheeled vehicle, and that the same is of course similarly applicable to a four-wheel vehicle, if desired.

As a result of my invention, in the forms illustrated herein it will be noted that a device is presented which has the general appearance, arrangement and characteristics of a bicycle but in which the necessity for constant pedaling is eliminated and in which, through my improved mechanism, it is made possible to reduce substantially the effort required on the part of the operator, an occasional depression of one foot only being necessary to keep the device moving on an ordinary roadway. Also, it will be evident that it is possible to propel the device at quite high speed along the average road or street by repeatedly depressing one foot or alternately depressing the feet, and that through the power connection to the seat while the operator ordinarily sits on the seat, he is still able to supplement the power whenever needed as, for example, by operating it when mounting a steep grade. Attention is also directed to the fact that the mechanism is so located beneath the operator and between his legs as to enable the operator's legs to be disposed substantially as they are in the average motorcycle during ordinary operation and with his feet in the periods between operation resting comfortably on a low, stationary support, as in a motorcycle. With the mechanism enclosed in a suitable casing, (not shown) the appearance of the device is also generally similar to a motorcycle, although the present device is much lighter and cheaper to manufacture. In operation, by a proper selection of pawls and ratchets the noise of operation may also be minimized if desired, but in certain adaptations of the device, however, particularly as a play device for children, any noise from the ratchets is an advantageous feature from the standpoint of the youthful operator, further enhancing the illusion of a motorcycle or other motor propelled vehicle. These and other advantages of my improved construction will, however, be clearly apparent to those skilled in the art.

While I have in this application specifically described two forms which my invention may assume in practice, it will be understood that the invention may be further modified and embodied in various other forms without departing from its spirit or the scope of the appended claims.

What I claim as new and desired to secure as Letters Patent is:

1. A propulsion mechanism for bicycles or the like comprising a power member located between the ground wheels and rotatable in the same direction as the later, mechanism for driving said power member disposed coaxially with said member, and actuating means for said driving mechanism including a plurality of independently movable foot levers below said member.

2. A propulsion mechanism for bicycles or the like comprising a power member located between the ground wheels and rotatable in the same direction as the latter, mechanism for driving said power member disposed coaxially with said member, and independently movable means for actuating said driving mechanism movable relative to pivot means in front of said member and operable by shifting the weight of an operator from one foot to another.

3. A propulsion mechanism for bicycles or the like comprising a power member located between the ground wheels and rotatable in the same direction as the latter, mechanism for driving said power member disposed coaxially with said member, and actuating means for said driving mechanism including a plurality of independently operable mechanisms each having a foot lever extending longitudinally below the axis of said member and operable by the depression of an operator's foot.

4. A propulsion mechanism for bicycles or the like comprising a power member located between the ground wheels and rotatable in the same direction as the latter, mechanism for driving said power member including a plurality of ratchet wheels and cooperating pawl carrying members, said wheels and pawl carrying members each being disposed coaxially with said member, and actuating means for said driving mechanism including a plurality of independently operable mechanisms and operable by the depression of either foot of an operator.

5. A propulsion mechanism for bicycles or the like comprising a power member located between the ground wheels and rotatable in the same direction as the latter, mechanism for driving said power member disposed coaxially with said member, and actuating means for said driving mechanism including means operable by the weight of an operator as he seats himself on the vehicle and foot actuated actuating means operable independently of said last mentioned means.

6. A propulsion mechanism for bicycles or the like comprising a power member located between the ground wheels and rotatable in the same direction as the latter, mechanism for driving said power member disposed coaxially with said member, and actuating means for said driving mechanism including means operable by the weight of an operator as he seats himself on the vehicle and a plurality of independent foot actuated actuating means operable independently of said last mentioned means and one of which is operable as the operator depresses either foot.

7. A propulsion mechanism for bicycles or the like comprising a power member operatively connected to the drive wheel, and mechanism for rotating said power member comprising a pair of normally elevated foot levers pivoted at one end in front of said power member and depressible at the other by an operator and independent operative connections between each of the same and said power member whereby each may be depressed independently of the other to rotate said power member.

8. A propulsion mechanism for bicycles or the like comprising a power member located between the ground wheels and connected to one of the same, a ratchet mechanism for driving said member including a pivoted elongated pawl carrying arm, and lever mechanism pivotally connected to said arm for moving said arm about its pivot.

9. A propulsion mechanism for bicycles or the like comprising a power member located between the ground wheels and connected to one of the same, a ratchet mechanism for driving said member including a pivoted elongated pawl carrying arm, and lever mechanism for moving said arm about its pivot including an element pivotally connected to said arm and depressible by the weight of an operator.

10. A propulsion mechanism for bicycles or the like comprising a power member located between the ground wheels and connected to one of the same, a ratchet mechanism for driving said member including a pivoted elongated pawl carrying arm, and lever mechanism for moving said arm about its pivot including a pivoted element pivotally connected thereto between the ends of said pivoted element and depressible by the operator.

11. A propulsion mechanism for bicycles or the like comprising a power member located between the ground wheels and rotating in the same direction as the latter, and a plurality of ratchet mechanisms coaxial with said member and each including a ratchet wheel and an elongated pawl carrying arm depressible by an operator and movable about the axis of its wheel.

12. A propulsion mechanism for bicycles or the like comprising a series of ratchet mechanisms connected to one of the ground wheels, foot lever connected mechanism whereby a plurality of the same may be actuated by a downward pressure of an operator's feet, and seat connected mechanism whereby another of the same may be operated by the weight of the operator's body.

13. A propulsion mechanism for bicycles or the like comprising a ratchet mechanism connected to one of the ground wheels and including a pivoted elongated pawl carrying arm extending longitudinally from the ratchet mechanism, and lever means for swinging said arm about its pivot actuated by the weight of an operator and pivotally connected to said arm.

14. A propulsion mechanism for bicycles or the like comprising a ratchet mechanism connected to one of the ground wheels and including a pivoted elongated pawl carrying arm extending longitudinally from the ratchet mechanism, lever connections connected to said arm and depressible by an operator for swinging said arm about its pivot, and means normally holding said connections in elevated position.

15. A propulsion mechanism for bicycles or the like comprising a rachet mechanism disposed between the wheels thereof and including a ratchet wheel and an elongated pawl carrying arm operable to operate said mechanism and extending longitudinally toward the front of the device and a swinging foot lever pivotally connected to said arm and extending below said ratchet wheel.

16. A propulsion mechanism for bicycles or the like comprising a ratchet mechanism disposed between the wheels thereof and including a plurality of elongated pawl carrying arms each extending forwardly from said ratchet mechanism and depressible by the weight of an operator, a plurality of ratchet wheels actuated by said pawl carrying arms and coaxial therewith, and a rotating driving member connected to a ground wheel and driven by either ratchet wheel.

17. A propulsion mechanism for bicycles or the like including an elongated lever pivoted at its front end and having a weight support at its rear end, a link connected to said member and reciprocable by movement of said lever about its pivot, and wheel driving mechanism operatively connected to said link.

18. A propulsion mechanism for bicycles or the like including an elongated lever member pivoted at its front end and having a weight support at its rear end, a link connected to said member intermediate the ends of the latter, and wheel driving mechanism operatively connected to said link.

19. A propulsion mechanism for bicycles or the like including an elongated lever member pivoted at its front end and having a weight support at its rear end, means for moving said member about its pivot when the weight is lessened, a link connected to said member intermediate the ends of the latter, and wheel driving mechanism operatively connected to said link.

20. A propulsion mechanism for bicycles or the like including an elongated lever member pivoted at its front end and having a weight support at its rear end, means for moving said member about its pivot when the weight is lessened, means for limiting depression of said member, a link connected to said member intermediate the ends of the latter, and wheel driving mechanism operatively connected to said link.

21. A propulsion mechanism for bicycles or the like including a plurality of elongated members pivoted at their front ends and having weight supports at their rear ends, one of said members being disposed above the others, and wheel driving mechanism operatively connected to said members and operated by movement of the same about their pivots.

22. A propulsion mechanism for bicycles or the like disposed between the wheels thereof and connected to a rear wheel, comprising a ratchet mechanism including three coaxial ratchets, and means for operating two of said ratchets by the operator's feet and one of the same by the weight of the operator's body.

23. A propulsion mechanism for bicycles or the like comprising a series of ratchet mechanisms each including an elongated pawl carrying arm, and means for operating said arms including a plurality of weight depressed elements operatively connected to certain arms and disposed below the same and one such element operatively connected to another arm and disposed above the same.

24. In a propulsion mechanism for bicycles or the like, a plurality of independently operable ratchet mechanisms, a foot lever for operating each mechanism movable about a pivot in front of the ratchet mechanisms and pivotally connected thereto intermediate its ends and in rear of its own pivot, and resilient means normally holding said foot levers in elevated poistion.

25. In a propulsion mechanism for bicycles or the like, a plurality of independently operable ratchet mechanisms, a foot lever for operating each mechanism movable about a pivot in front of the ratchet mechanisms and pivotally connected thereto intermediate its ends and in rear of its own pivot, resilient means normally holding said foot levers in elevated position, and supporting means limiting the downward movement of said levers.

26. In a propulsion mechanism for bicycles or the like, a rotating power member between the ground wheels, rotating mechanism therefor, a sprocket driven by said power member and located in front thereof, and a sprocket coaxial with said sprocket and operatively connected to the rear ground wheel.

27. In a propulsion mechanism for bicycles or the like, a rotating power member between the ground wheels, rotating mechanism therefor, a sprocket driven by said power member and located in front thereof, a sprocket coaxial with said sprocket and rotatable therewith, and further gearing up sprockets in rear of said power member and operatively connected to the front sprocket and to the rear ground wheel.

28. A propulsion mechanism for bicycles or the like comprising a power member located between the ground wheels and rotatable in the same direction as the latter, and operative connections between the same and one of the ground wheels likewise rotatable in the same direction and including a sprocket rotatable on an axis in front of said power member.

29. A propulsion mechanism for bicycles or the like comprising a power member located between the ground wheels, mechanism operated by the weight of an operator for rotating the same in the same direction as said wheels, and operative connections between said power member and one of the ground wheels likewise rotatable in the same direction as the latter and including a member rotatable on an axis in front of said power member.

30. A propulsion mechanism for bicycles or the like comprising a power member located between the ground wheels, ratchet mechanism operated by the weight of an operator for rotating the same in the same direction as said wheels, and operative connections between said power member and one of the ground wheels likewise rotatable in the same direction as the latter and including a member rotatable on an axis in front of said power member.

In testimony whereof I affix my signature.

DELOSS C. BEMONT.